(12) United States Patent
Laprade

(10) Patent No.: US 8,252,400 B2
(45) Date of Patent: Aug. 28, 2012

(54) HEAT-TRANSFER LABEL ASSEMBLY AND METHOD OF USING THE SAME

(75) Inventor: Jean Paul Laprade, North Smithfield, RI (US)

(73) Assignee: MCC-Dec Tech, LLC, Cincinnati, OH (US)

( * ) Notice: Subject to any disclaimer, the term of this patent is extended or adjusted under 35 U.S.C. 154(b) by 482 days.

(21) Appl. No.: 11/644,803

(22) Filed: Dec. 22, 2006

(65) Prior Publication Data

US 2007/0104946 A1 May 10, 2007

Related U.S. Application Data

(63) Continuation of application No. 10/067,685, filed on Feb. 4, 2002, now abandoned.

(60) Provisional application No. 60/349,134, filed on Jan. 16, 2002.

(51) Int. Cl.
*B32B 9/00* (2006.01)
*B32B 7/12* (2006.01)

(52) U.S. Cl. ........ 428/40.1; 428/343; 428/352; 428/354

(58) Field of Classification Search .................. 428/40.1, 428/343, 352, 354
See application file for complete search history.

(56) References Cited

U.S. PATENT DOCUMENTS

| | | | |
|---|---|---|---|
| 3,616,015 A | 10/1971 | Kingston | |
| 3,907,974 A | 9/1975 | Smith | |
| 4,321,185 A | 3/1982 | Benitez | |
| 4,548,857 A | 10/1985 | Galante | |
| 4,555,436 A | 11/1985 | Geurtsen et al. | |
| 4,935,300 A | 6/1990 | Parker et al. | |
| 5,448,282 A | 9/1995 | Imai et al. | |
| 5,607,896 A | 3/1997 | Hutt | |
| 5,891,520 A * | 4/1999 | Makar et al. | 427/269 |
| 5,968,689 A | 10/1999 | Torikoshi et al. | |
| 6,004,419 A | 12/1999 | Torii | |
| 6,042,676 A | 3/2000 | Stein | |
| 6,096,408 A | 8/2000 | Laprade et al. | |

(Continued)

FOREIGN PATENT DOCUMENTS

EP 0819726 A2 1/1998

(Continued)

OTHER PUBLICATIONS

Derwent Abstract of JP 01166991A.

(Continued)

*Primary Examiner* — Victor Chang
(74) *Attorney, Agent, or Firm* — Kriegsman & Kriegsman

(57) ABSTRACT

A heat-transfer label assembly and method of using the same. In one embodiment, the assembly is adapted for decorating glass articles and comprises a carrier, the carrier comprising a paper substrate overcoated with a layer of polyethylene. The polyethylene layer is overcoated with a skim coat of wax. One or more heat-transfer labels are printed onto the skim coat and are spaced apart from one another. Each label consists of one or more ink design layers, each ink design layer comprising a binder resin, a pigment, a cross-linking resin and a catalyst. The catalyst is capable of causing the cross-linking resin to cross-link the binder resin within 1-2 minutes after the label has been transferred to a glass article that has been preheated to a temperature of about 250° F.-325° F.

8 Claims, 1 Drawing Sheet

U.S. PATENT DOCUMENTS

| | | | |
|---|---|---|---|
| 6,099,944 | A | 8/2000 | Laprade et al. |
| 6,376,069 | B1 | 4/2002 | Bilodeau et al. |
| 6,391,415 | B1 * | 5/2002 | McCurry et al. ............ 428/40.1 |
| 6,537,651 | B2 | 3/2003 | Geurtsen et al. |
| 6,902,641 | B1 | 6/2005 | Patel et al. |

FOREIGN PATENT DOCUMENTS

WO  WO 01/03950 A1  1/2001

OTHER PUBLICATIONS

ViTEL 2000-3000 Technical Guide, Shell Chemical Company, Akron, Ohio, published before the filing of the present application.

Technical literature for Cytec High Solids Amino Crosslinking Agents, Cytec Industries, Inc., West Paterson, NJ, published before the filing of the present application.

Technical literature for UCAR Solution Vinyl Resins for Coatings, Union Carbide, Danbury, CT, published before the filing of the present application.

Technical literature for NACURE and K-CURE acid and blocked acid catalysts, King Industries, Norwalk, CT, published before the filing of the present application.

Product document of Cymel 385 by Cytec Industries, Inc.

* cited by examiner

HEAT-TRANSFER LABEL ASSEMBLY AND METHOD OF USING THE SAME

CROSS-REFERENCE TO RELATED APPLICATIONS

The present application is a continuation of U.S. patent application Ser. No. 10/067,685, filed Feb. 4, 2002 now abandoned, which application, in turn, claims the benefit under 35 U.S.C. 119(e) of U.S. Provisional Patent Application Ser. No. 60/349,134, filed Jan. 16, 2002, the disclosures of both of which are incorporated herein by reference.

BACKGROUND OF THE INVENTION

The present invention relates generally to heat-transfer label assemblies and more particularly to a novel heat-transfer label assembly and to a method of using the same.

Heat-transfer labels are implements commonly used to decorate and/or to label commercial articles, such as, and without limitation to, containers for beverages (including alcoholic beverages, such as beer), essential oils, detergents, adverse chemicals, as well as health and beauty aids. As can readily be appreciated, heat-transfer labels are desirably resistant to abrasion and chemical effects in order to avoid a loss of label information and desirably possess good adhesion to the articles to which they are affixed. Heat-transfer labels are typically constructed as part of a heat-transfer label assembly, with one or more heat-transfer labels printed on a removable carrier web.

One of the earliest types of heat-transfer label assemblies is described in U.S. Pat. No. 3,616,015, inventor Kingston, which issued October, 1971, and which is incorporated herein by reference. In the aforementioned patent, there is disclosed a heat-transfer label assembly adapted for labeling plastic objects, the heat-transfer label assembly comprising a paper sheet or web, a wax release layer affixed to the paper sheet, and an ink design layer printed on the wax release layer. In the heat-transfer labeling process, the label-carrying web is subjected to heat, and the label is pressed onto a plastic article with the ink design layer making direct contact with the plastic article. As the paper sheet is subjected to heat, the wax layer begins to melt. This enables the paper sheet to be released from the ink design layer, with a portion of the wax layer being transferred with the ink design layer onto the plastic article and with a portion of the wax layer remaining with the paper sheet. After transfer of the design to the plastic article, the paper sheet is immediately removed, leaving the design firmly affixed to the plastic article and the wax transferred therewith exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming or post-heating technique which involves subjecting the transferred wax release layer to jets of high temperature gas either as direct gas flames or as hot air jets to produce wax surface temperatures of about 300° F. to 400° F. for a period of time sufficient to remelt the transferred wax. This remelting of the transferred wax is performed to enhance the optical clarity of the wax protective layer (thereby enabling the ink design layer there beneath to be better observed) and to enhance the protective properties of the transferred wax release.

Unfortunately, despite the aforementioned post-flaming step, the transferred wax layer is often perceptible on clear and/or dark-colored objects.

Consequently, a great deal of effort has been expended in replacing or obviating the need for a wax release layer. One type of heat-transfer label assembly that does not include a wax release layer is exemplified by U.S. Pat. No. 4,935,300, inventors Parker et al., which issued Jun. 19, 1990, and which is incorporated herein by reference. In the aforementioned Parker patent, the label assembly, which is said to be particularly well-suited for use on high density polyethylene, polypropylene, polystyrene, polyvinylchloride and polyethylene terephthalate surfaces or containers, comprises a paper carrier web which is overcoated with a layer of thermoplastic polyethylene. A protective lacquer layer comprising a polyester resin and a relatively small amount of a nondrying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described Parker label assembly substantially reduces the wax-related effects discussed previously, said label assembly does not quite possess the same release characteristics of heat-transfer label assemblies containing a wax release layer. In fact, when put to commercial use, the polyethylene release layer of the Parker label assembly was found to become adhesive when subjected to the types of elevated temperatures typically encountered during label transfer. Accordingly, another type of heat-transfer label assembly differs from the Parker heat-transfer label assembly in that a very thin layer or "skim coat" of carnauba wax is interposed between the polyethylene release layer and the protective lacquer layer to improve the release of the protective lacquer from the polyethylene-coated carrier web. The thickness of the skim coat corresponds to approximately 0.1-0.4 lbs. of the wax spread onto about 3000 square feet of the polyethylene release layer. The aforementioned "skim coat-containing" heat-transfer label assembly also differs from the Parker label assembly in that the heat-activatable adhesive of the "skim coat" label assembly is printed over the entirety of the ink and protective lacquer layers, with the peripheral edges of the adhesive layer in direct contact with the wax skim coat.

An example of a "skim coat-containing" heat-transfer label assembly of the type described above is disclosed in U.S. Pat. No. 6,099,944, inventors Laprade et al., which issued Aug. 8, 2000, and which is incorporated herein by reference. According to the aforementioned patent, a label assembly is provided that is designed for use in decorating clear glass articles in such a way as to give such articles the appearance of having been frosted. In a preferred embodiment, the label includes (a) a support portion in the form of a sheet of paper overcoated with a release layer of polyethylene, (b) a skim coat of wax overcoated onto the polyethylene release layer and (c) a transfer portion, the transfer portion including a protective lacquer layer printed onto the skim coat, an ink layer printed onto the protective lacquer layer, and an adhesive layer printed onto the ink layer, as well as onto any exposed portions of the underlying protective lacquer layer and onto a surrounding area of the skim coat. The protective lacquer layer comprises a solvent-soluble phenoxy resin that has been cross-linked by a melamine resin. The ink layer comprises a design printed with a frosted ink, the frosted ink preferably comprising a solvent-soluble phenoxy resin, a silica and a colorant. The adhesive layer comprises a phenoxy resin of the type present in a water-based phenoxy resin dispersion.

Examples of other "skim coat-containing" heat-transfer label assemblies are disclosed in the following U.S. patents, all of which are incorporated herein by reference: U.S. Pat. No. 5,800,656, inventors Geurtsen et al., issued Sep. 1, 1998; U.S. Pat. No. 6,096,408, inventors Laprade et al., issued Aug. 1, 2000; U.S. Pat. No. 6,033,763, inventors Laprade et al., issued Mar. 7, 2000; and U.S. Pat. No. 6,083,620, inventors Laprade et al., issued Jul. 4, 2000.

When using a "skim coat-containing" heat-transfer label assembly of the type described above to decorate an article, one typically preheats the article and the label assembly prior to decoration. (Where the article is made of glass, the article is typically preheated to a temperature of about 300° F. In addition, a silane adhesion promoter is also typically applied to the glass article prior to preheating.) Decoration is typically performed by applying heat to the bottom of the carrier while the top of the label is pressed against the article. Once the transferred portion of the heat-transfer label assembly has been applied to the article, the labeled article is then typically subjected to a post-heating step so that the protective lacquer layer and/or the adhesive layer, one or both of which typically comprise thermosetting resins, may be cured. (By contrast, the ink layer of the above-described heat-transfer label assembly does not include a thermosetting resin.) Said post-heating step is typically performed by conveying the labeled articles through one or more industrial ovens to heat the articles to an elevated temperature, such as 400° F., for a particular amount of time, typically 15-20 minutes. However, as can readily be appreciated, industrial ovens of the aforementioned type are not only space-consuming but also very expensive to purchase, to maintain and to operate.

Accordingly, the present inventor has identified a need for a heat-transfer label assembly that does not require the post-heating of the labeled article.

SUMMARY OF THE INVENTION

It is an object of the present invention to provide a novel heat-transfer label assembly.

It is another object of the present invention to provide a heat-transfer label assembly as described above that overcomes at least some of the problems associated with existing heat-transfer label assemblies of the type described above, such as the need for a post-heating step of the labeled article.

In furtherance of the above and other objects to be set forth or to become apparent from the description to follow, and according to one aspect of the invention, there is provided a heat-transfer label assembly, said heat-transfer label assembly comprising (a) a carrier; (b) a wax skim coat deposited onto said carrier; and (c) a heat-transfer label, said heat-transfer label being deposited onto said wax skim coat for transfer of said heat-transfer label from said carrier to an article under conditions of heat and pressure, said heat-transfer label comprising one or more ink design layers, each of said ink design layers being thermosetting within about 1-2 minutes after said ink design layer has been transferred to an article heated to a temperature of about 250° F.-325° F.

Preferably, said carrier comprises a paper substrate overcoated with a layer of polyethylene, said wax skim coat being deposited onto said polyethylene layer. In addition, said heat-transfer label preferably consists of said one or more ink design layers, each of said ink design layers preferably comprising a binder, such as a polyester resin, a colorant and a cross-linking system. Said cross-linking system preferably comprises a cross-linking resin, such as a melamine-formaldehyde resin, and a heat-activatable catalyst, such as an amine-blocked sulfonic acid catalyst, for catalyzing the cross-linking of said cross-linking resin to the binder within about 1-2 minutes after transfer of said heat-transfer label to an article heated to a temperature in the range of about 250° F.-325° F.

According to another aspect of the invention, there is provided a heat-transfer label assembly, said heat-transfer label assembly comprising (a) a carrier; and (b) a heat-transfer label, said heat-transfer label being deposited onto said carrier for transfer of said heat-transfer label from said carrier to an article under conditions of heat and pressure, said heat-transfer label comprising one or more ink design layers, each of said ink design layers being thermosetting within about 1-2 minutes after said ink design layer has been transferred to an article heated to a temperature of about 250° F.-325° F.; (c) wherein said carrier is made of a non-wax material that separates cleanly from said heat-transfer label with no visually discernible portion of said carrier being transferred to the article along with said heat-transfer label. Preferably, said carrier comprises a polymeric film overcoated with a release coating made of a non-wax, non-silicone, thermoset release material, said release coating having a total surface energy of about 25 to 35 mN/m, of which about 0.1 to 4 mN/m is polar surface energy, and having a carbon content (by atomic %) of about 97% and an oxygen content (by atomic %) of about 3%, as measured by X-ray photoelectron spectroscopy.

The present invention is also directed to an ink formulation, said ink formulation comprising (a) a binder resin; (b) a colorant; (c) one or more volatile solvents; and (d) a cross-linking system, said cross-linking system being adapted to effect cross-linking of the binder resin within about 1-2 minutes after application of a dried, printed design made with said ink formulation to an article heated to a temperature of about 250° F.-325° F.

The present invention is further directed to a method of decorating a glass article, said method comprising the steps of (a) providing a heat-transfer label assembly, said heat-transfer label assembly comprising (i) a carrier; and (ii) a heat-transfer label, said heat-transfer label being releasably secured to said carrier for transfer of said heat-transfer label from said carrier to a glass article under conditions of heat and pressure, said heat-transfer label comprising one or more ink design layers, each of said ink design layers being thermosetting within about 1-2 minutes after said ink design layer has been transferred to a glass article heated to a temperature of about 250° F.-325° F.; (b) providing a glass article; (c) heating said glass article to a temperature of about 250° F.-325° F.; and (d) while said glass article is at said temperature of about 250° F.-325° F., transferring said heat-transfer label from said carrier to said glass article.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
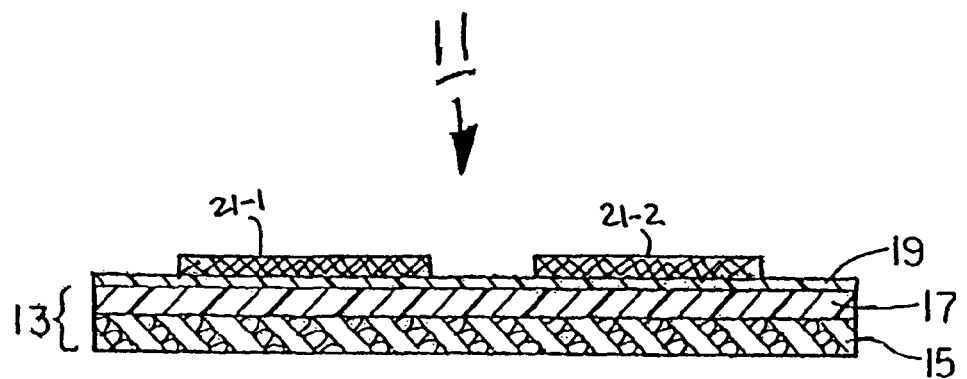
FIG. 1 is a schematic section view of a first embodiment of a heat-transfer label assembly constructed according to the teachings of the present invention.

Referring now to FIG. 1, there is shown a schematic section view of a first embodiment of a heat-transfer label assembly, said heat-transfer label assembly being represented generally by reference numeral 11.

Assembly 11 comprises a carrier 13. Carrier 13, in turn, comprises a paper substrate 15 overcoated with a polyethylene layer 17. Details of polyethylene layer 17 are disclosed in U.S. Pat. Nos. 4,935,300 and 4,927,709, the disclosures of which are incorporated herein by reference.

Assembly 11 also comprises a wax skim coat 19 of the type described above, skim coat 19 being coated directly on top of the entirety of polyethylene layer 17. As will be explained below in greater detail, during label transfer, a portion of skim coat 19 is typically transferred along with the label onto the article being decorated, and a portion of skim coat 19 remains on top of polyethylene layer 17.

Assembly 11 further comprises a plurality of spaced-apart heat-transfer labels 21-1 and 21-2 (it being understood that, although two heat-transfer labels 21 are shown in the present embodiment, assembly 11 could be modified to include any number of such labels), heat-transfer labels 21-1 and 21-2 being positioned directly on top of skim coat 19 for transfer of labels 21-1 and 21-2, under appropriate conditions of heat and pressure, from carrier 13 to suitable articles, such as glass containers.

In the present embodiment, heat-transfer label 21 consists of one or more ink design layers printed directly onto skim coat 19. Each of said one or more ink design layers is formed by depositing, preferably by gravure printing, an ink composition of the type to be described below and, thereafter, allowing the volatile solvent(s) of the ink composition to evaporate, leaving only the non-volatile components of said ink composition to form label 21.

The ink composition of the present invention comprises (i) a resinous binder; (ii) a cross-linking system adapted to effect cross-linking of the resinous binder within about 1-2 minutes after transfer of label 21 to an article that has been heated to a temperature of about 250° F.-325° F., preferably about 275° F.-325° F.; (iii) a colorant; and (iv) one or more suitable volatile solvents.

Said resinous binder may be one or more resins of the type commonly used in heat-transfer label inks including, but not limited to, polyester resins, polyester/vinyl resins, polyamide resins, phenoxy resins, epoxy resins, polyketone resins, and acrylic resins. Examples of preferred resins include ViTEL® 2700 (Shell Chemical Company, Akron, Ohio), a copolyester resin having a high tensile strength (7000 psi) and a low elongation (4% elongation), and ViTEL® 2300 (Shell Chemical Company), another copolyester resin having a high tensile strength (8000 psi) and a low elongation (7% elongation).

A vinyl chloride/vinyl acetate resinous binder may be added to the aforementioned binder(s) in an amount constituting up to about 25%, by weight, of the total binder, to impart gloss to the labeled product. An example of a preferred vinyl chloride/vinyl acetate resin is VAGH (Union Carbide), a high molecular weight, partially-hydrolyzed vinyl chloride/vinyl acetate resin having a composition of approximately 90 percent vinyl chloride, 4 percent vinyl acetate, with a hydroxyl content of approximately 2.3 percent.

The cross-linking system of the subject ink composition preferably comprises (i) a cross-linking resin for cross-linking the resinous binder and (ii) a heat-activatable catalyst for catalyzing the cross-linking of the cross-linker to the resinous binder within about 1-2 minutes after transfer of label 21 to an article heated to a temperature in the range of about 250° F.-325° F., preferably about 275° F.-325° F. Examples of suitable cross-linking resins include partially methylated melamine-formaldehyde resins of the type present in the CYMEL 300 series of partially methylated melamine-formaldehyde resin solutions (Cytec Industries, Inc., West Paterson, N.J.) and, in particular, CYMEL 370 partially methylated melamine-formaldehyde resin solution (88±2% nonvolatiles, iBuOH solvent). Such a cross-linker is preferably present in the ink composition in an amount constituting about 5%-10%, by weight, of the total binder. An example of a suitable catalyst is an amine-blocked sulfonic acid catalyst, such as Nacure® 1323 blocked catalyst (King Industries, Norwalk, Conn.). Such a catalyst is preferably present in the ink composition in an amount constituting about 0.01% to 1%, by weight, of the total binder.

The colorant is a pigment and is preferably present in the ink composition in an amount representing about 50% to 200%, by weight, of the other non-volatile components of the formulation. Where the pigment is titanium dioxide, the relative proportion of colorant to the other non-volatile components is preferably about 2:1, by weight, respectively; for pigments other than titanium dioxide, the relative proportion of colorant to the other non-volatile components is preferably about 1:2, respectively.

The one or more volatile solvents are typically volatile solvents of the type commonly used in heat-transfer label inks and may be, for example, a mixture of methyl ethyl ketone (MEK) and toluene, said MEK/toluene mixture preferably being a 1:1 mixture and preferably being present in the ink composition in an amount constituting about 40%-75%, by weight, of the total ink composition. The particular proportion of solvent(s) to non-volatile components is typically dependent upon the viscosity requirements for printing, with the objective typically being to maximize the percentage of non-volatiles (and, therefore, viscosity) while still achieving good print quality.

Illustrative ink formulations for use in making label 21 are as follows:

| | % By Weight |
|---|---|
| Formulation No. 1 (White) | |
| Titanium dioxide | 16.67 |
| ViTEL ® 2700 copolyester resin | 3.75 |
| ViTEL ® 2300 copolyester resin | 3.75 |
| VAGH vinyl chloride/vinyl acetate resin | 0.42 |
| Cymel 370 melamine-formaldehyde resin | 0.42 |
| Nacure 1323 amine-blocked sulfonic acid catalyst | 0.024 |
| MEK | 37.5 |
| Toluene | 37.5 |
| Formulation No. 2 (Non-white) | |
| Non-white pigment | 8.33 |
| ViTEL ® 2700 copolyester resin | 7.5 |
| ViTEL ® 2300 copolyester resin | 7.5 |
| VAGH vinyl chloride/vinyl acetate resin | 0.83 |
| Cymel 370 melamine-formaldehyde resin | 0.83 |
| Nacure 1323 amine-blocked sulfonic acid catalyst | 0.047 |
| MEK | 37.5 |
| Toluene | 37.5 |

Assembly 11 is particularly well-suited for use in decorating glass articles, such as glass containers. (Assembly 11 may also be used to decorate plastic articles, such as polyethylene napthylene (PEN) articles, or other types of non-glass articles that are capable of withstanding the elevated preheating temperatures needed to activate the cross-linking system of label 21.) In use, such glass articles are preferably treated, prior to labeling, with a silane adhesion promoter of the type described in U.S. Pat. No. 3,907,974, inventor Smith, which issued Sep. 23, 1975, and which is incorporated herein by reference. The silane-treated glass articles are then pre-heated in a conventional manner to a temperature of about 250° F.-325° F., preferably about 275° F.-325° F. While at said temperature, the silane-treated glass articles are then decorated by bring labels 21 into direct contact therewith while sufficient heat (about 300 to 450° F.) is applied to the bottom of carrier 13 to cause skim coat 19 to soften sufficiently to release labels 21 from carrier 13 and to cause the binder in label 21 to become tacky. Within a very short time after transfer of label 21 onto the glass article and without any need for post-heating, label 21 cures due to the heat-activation of the cross-linking system there within.

The above-described decoration of an article using assembly 11 may be performed using conventional heat-transfer machinery (e.g., conventional cascading unit for applying silane adhesion promoter to the glass article, conventional preheating unit for heating the glass article to about 250° F.-325° F., and conventional turret assembly for applying label to article from web).

As can readily be appreciated, one advantage of assembly 11, as opposed to conventional heat-transfer label assemblies, is that no post-heating of the decorated article is necessary since label 21 cures substantially instantaneously after transfer. Moreover, the decoration of an article with assembly 11 can be performed without requiring any changes to the pre-decorating and decorating steps conventionally employed in heat-transfer labeling. Another advantage is that assembly 11 obviates the need for protective lacquer and adhesive layers surrounding the ink design layer. At the same time, the aesthetic quality of label 21 of assembly 11 is comparable to or better than existing heat-transfer labels (in part because some existing labels experience a problem of hazing in the protective lacquer layer).

It should be noted that, by omitting the colorant from label 21, one can obtain a fast-curing protective lacquer or adhesive layer that may be substituted for a corresponding layer in a conventional heat-transfer label assembly.

Figure 2:
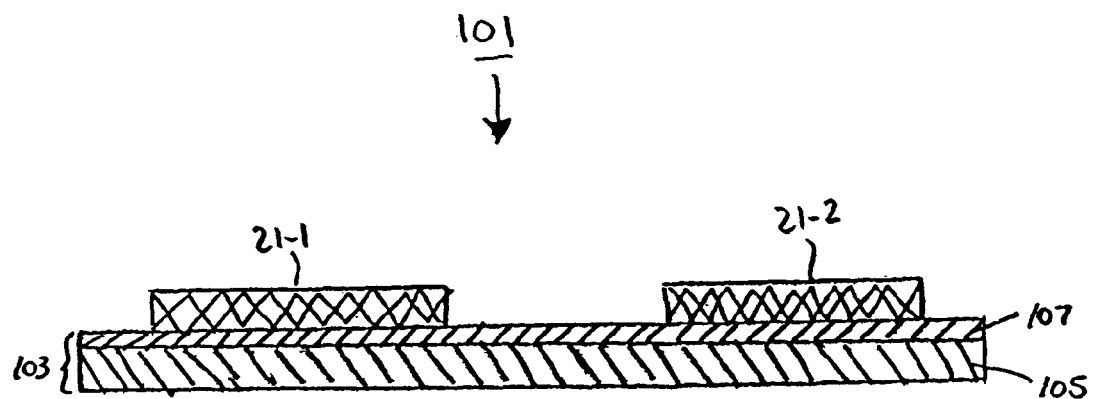
FIG. 2 is a schematic section view of second embodiment of a heat-transfer label assembly constructed according to the teachings of the present invention.

Referring now to FIG. 2, there is shown a schematic section view of a second embodiment of a heat-transfer label assembly constructed according to the teachings of the present invention, said heat-transfer label assembly being represented generally by reference numeral 101.

Assembly 101 is similar in many respects to assembly 11, the principal difference between the two assemblies being that assembly 101 comprises a carrier 103, instead of carrier 13, and does not comprise a skim coat 19. Carrier 103 comprises a polymeric substrate 105 and a release coating 107 deposited on top of polymeric substrate 105. Substrate 105 is preferably a polymeric film selected from the group consisting of polyesters, such as polyethylene terephthalate, polyethylene napthylene; polyolefins, such as polyethylene and polypropylene; and polyamides.

More preferably, substrate 105 is a clear plastic film of the type described above. As can readily be appreciated, one benefit to using a clear material as substrate 105 is that, if desired, one can inspect the quality of the printed matter of the label by looking at said printed matter through substrate 105 (from which perspective said printed matter appears as it will on the labeled article), as opposed to looking at said printed matter through the adhesive layer of the label (from which perspective said printed matter appears as the mirror image of what will appear on the labeled article).

A particularly preferred plastic material for use as substrate 105 is a clear polyester film, such as a clear polyethylene terephthalate (PET) film. This is because, at least as compared to some other plastic materials like polyethylene and polypropylene, polyester is a strong plastic material and makes a good substrate to be printed onto. In addition, unlike polyethylene, polyester does not tend to soften and become tacky at the types of temperatures typically encountered during heat-transfer. Typically, substrate 105 has a thickness of about 1-2 mil.

Coating 107 is preferably applied directly on top of substrate 105. Coating 107 is a thermoset release material that separates cleanly from label 21 and is not transferred, to any visually discernible degree, with label 21 onto an article being labeled. (For purposes of the present specification and claims, the term "visually discernible" is to be construed in terms of an unaided or naked human eye.) Preferably, release coating 107 is clear for the same types of reasons given above in connection with substrate 105.

Coating 107 does not contain any waxes or any silicones, except to the limited extent provided below, and the terms "non-wax" and "non-silicone," when used in the present specification and claims to describe and to define the present release layer or coating, are defined herein to exclude from said release layer or coating the presence of any and all waxes and silicones not encompassed by the limited exceptions provided below or described in published PCT Application No. WO 01/03950, published Jan. 18, 2001, the disclosure of which is incorporated herein by reference.

Coating 107 preferably has a thickness of about 0.01 to 10 microns, more preferably about 0.02 to 1 micron, even more preferably about 0.1 micron. In addition, coating 107 preferably has a total surface energy of about 25 to 35 mN/m (preferably about 30 mN/m), of which about 0.1 to 4 mN/m (preferably about 1.3 mN/m) is polar surface energy. Furthermore, when analyzed by XPS (X-ray photoelectron spectroscopy), coating 107 preferably has a carbon content (by atomic %) of about 90 to 99.9% (preferably about 97%) and an oxygen content (by atomic %) of about 0.1 to 10% (preferably about 3%). Accordingly, coating 107 is predominantly a hydrocarbon in its chemical makeup.

An example of a coated polymer film suitable for use as carrier 103 of the present invention is available from DuPont Corp. (Wilmington, Del.) as product number 140AXM 701 (140 gauge coated polyester film). Other coated polymer films which may be used as carrier 103 are described in European Patent Application No. 819,726, published Jan. 21, 1998, which document is incorporated herein by reference. The aforementioned European patent application teaches a coated film structure preferably comprising:

(i) polymers selected from the group consisting of polyesters such as polyethylene terephthalate, polyethylene napthylene; polyolefins such as polyethylene and polypropylene; and polyamides; wherein said polymers form a polymeric film surface; and (ii) a primer coating comprising:

(A) functionalized α-olefin containing copolymers, preferably acid functionalized α-olefin containing copolymers, selected from the group consisting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers; propylene/acrylic acid copolymers; etc. and (B) crosslinking agents selected from the group consisting of amino formaldehyde resins, polyvalent metal salts, isocyanates, blocked isocyanates, epoxy resins and polyfunctional aziridines;

(iii) wherein said primer coating is applied as a primer to the polymeric film surface, preferably in its amorphous or semi-oriented state and reacted with newly generated polymeric film surfaces formed during uniaxial or biaxial stretching and heat setting.

Although the above-described polymeric film surface is preferably formed of a polyester, a polyolefin, or a polyamide, it may be formed form any material capable of being formed into a sheet or film. The polymeric film surface should be capable of binding or reacting with an acid-functionalized α-olefin copolymer to form a modified film base.

The above-mentioned polymer films can be manufactured by an extrusion process, such as a cast film or blown film process. In a cast film process, the polymer resin is first heated to a molten state and then extruded through a wide slot die in the form of an amorphous sheet. The sheet-like extrudate is rapidly cooled or "quenched" to form a cast sheet of polyester by contacting and traveling partially around a polished, revolving casting drum. Alternatively, the extrudate can be blown in a conventional blown film process. Regardless of the process, however, the polyester sheet is preferably uniaxially or biaxially (preferably biaxially) stretched in the direction of film travel (machine direction) and/or perpendicular to the machine direction (traverse direction), while being heated to a temperature in the range of from about 80° C. to 160° C., preferably about 90° C. to 110° C., the degree of stretching may range from 3.0 to 5.0 times the original cast sheet unit dimension, preferably from about 3.2 to about 4.2 times the original cast sheet dimension. Reaction with the newly generated polymer film surfaces formed during stretching preferably occurs at temperatures about 130° C. or higher.

Additives such as coating aids, wetting aids such as surfactants (including silicone surfactants), slip additives, antistatic agents can be incorporated into the primer coating in levels from 0 to 50% based on the total weight of additive-free coating solids.

In another embodiment (not shown), a paper substrate, such as paper substrate 15, is applied to the bottom of carrier 103.

The embodiments of the present invention recited herein are intended to be merely exemplary and those skilled in the art will be able to make numerous variations and modifications to it without departing from the spirit of the present invention. For example, it should be appreciated that one may add, either directly or through trans-layer migration, trace or non-functional minor amounts of waxes or silicones to the release layer described herein as "non-wax" and "non-silicone" without being outside the scope of applicants' invention. Thus, the terms "non-wax" and "non-silicone" as used herein is intended to embrace this possibility. All such variations and modifications are intended to be within the scope of the present invention as defined by the claims appended hereto.

What is claimed is:

1. A heat-transfer label assembly suitable for use in labeling a glass container, said heat-transfer label assembly consisting of:

(a) a carrier, said carrier consisting of a paper substrate overcoated with a layer of polyethylene;

(b) a wax skim coat deposited onto said polyethylene layer of said carrier, said wax skim coat having a thickness of about 0.1-0.4 lbs, per 3000 square feet; and (c) a heat-transfer label, said heat-transfer label being deposited directly onto said wax skim coat for transfer of said heat-transfer label from said carrier to an article under conditions of heat and pressure, said heat-transfer label consisting of one or more ink design layers, each of said ink design layers being thermosetting and consisting of a binder, a colorant and a cross-linking system, said binder consisting of a copolyester resin and a vinyl chloride/vinyl acetate resin, said cross-linking system consisting of (i) a cross-linking resin for cross-linking said binder, said cross-linking resin consisting of a melamine-formaldehyde resin and (ii) a heat-activatable catalyst for catalyzing said cross-linking within about 1-2 minutes after said ink design layer has been transferred to an article that has been pre-heated, prior to label transfer, to a temperature of about 250° F.-325° F., said heat-activatable catalyst consisting of an amine-blocked sulfonic acid catalyst.

2. The heat-transfer label assembly as claimed in claim 1 wherein said vinyl chloride/vinyl acetate resin constitutes up to about 25%, by weight, of said binder.

3. The heat-transfer label assembly as claimed in claim 1 wherein said copolyester resin has a high tensile strength and low elongation.

4. The heat-transfer label assembly as claimed in claim 1 wherein said colorant is a pigment, said pigment being present in an amount ranging from about 50% to about 200%, by weight, of the total of said binder and said cross-linking system.

5. The heat-transfer label assembly as claimed in claim 4 wherein said pigment is titanium dioxide.

6. The heat-transfer label assembly as claimed in claim 1 wherein said cross-linking resin is present in an amount constituting about 5%-10%, by weight, of said binder.

7. The heat-transfer label assembly as claimed in claim 1 wherein said cross-linking resin consists of a partially methylated melamine-formaldehyde resin.

8. A heat-transfer label assembly suitable for use in labeling a glass container, said heat-transfer label assembly consisting of:
- (a) a carrier, said carrier consisting of a paper substrate overcoated with a layer of polyethylene;
- (b) a wax skim coat deposited onto said polyethylene layer of said carrier, said wax skim coat having a thickness of about 0.1-0.4 lbs, per 3000 square feet; and
- (c) a heat-transfer label, said heat-transfer label being deposited directly onto said wax skim coat for transfer of said heat-transfer label from said carrier to an article under conditions of heat and pressure, said heat-transfer label consisting of one or more ink design layers, each of said ink design layers being thermosetting and consisting of a binder, a colorant and a cross-linking system, said binder consisting of a first copolyester resin, a second copolyester resin, and a vinyl chloride/vinyl acetate resin, said cross-linking system consisting of (i) a cross-linking resin for cross-linking said binder, said cross-linking resin consisting of a melamine-formaldehyde resin and (ii) a heat-activatable catalyst for catalyzing said cross-linking within about 1-2 minutes after said ink design layer has been transferred to an article that has been pre-heated, prior to label transfer, to a temperature of about 250° F.-325° F., said heat-activatable catalyst consisting of an amine-blocked sulfonic acid catalyst, wherein said first copolyester resin constitutes about 47%, by weight, of said binder and has a tensile strength of 7000 psi and a 4% elongation, wherein said second copolyester resin constitutes about 47%, by weight, of said binder and has a tensile strength of 8000 psi and a 7% elongation, and wherein said vinyl chloride/vinyl acetate resin constitutes about 5%, by weight, of said binder and has a composition of approximately 90 percent vinyl chloride, 4 percent vinyl acetate, with a hydroxyl content of approximately 2.3 percent.

* * * * *